E. C. McKENZIE & J. P. DEVER.
AUTOMOBILE SIGNAL.
APPLICATION FILED NOV. 22, 1915. RENEWED SEPT. 9, 1916.
1,201,482.
Patented Oct. 17, 1916.
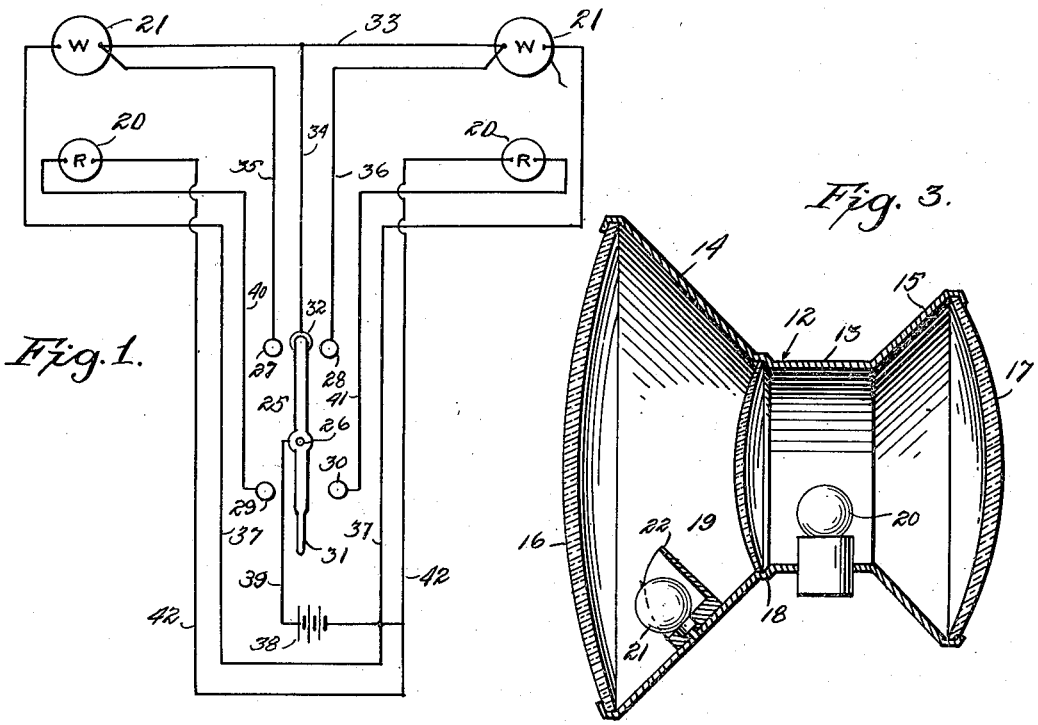
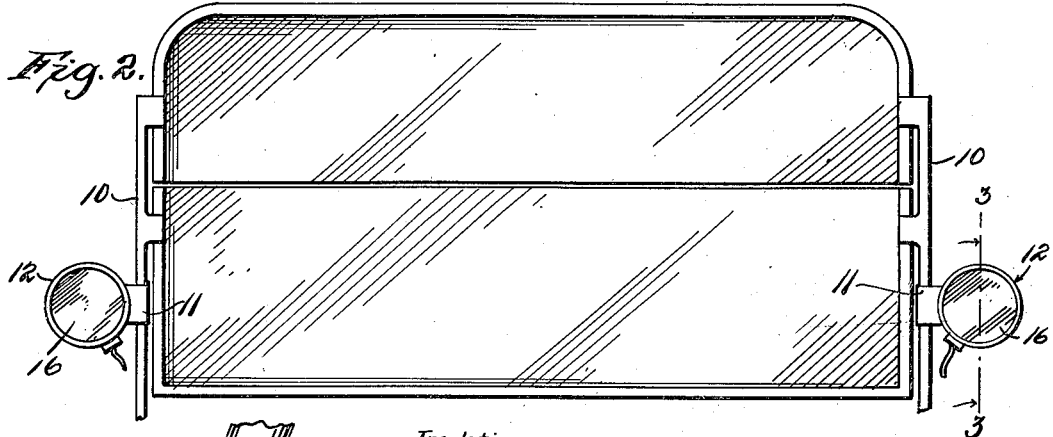
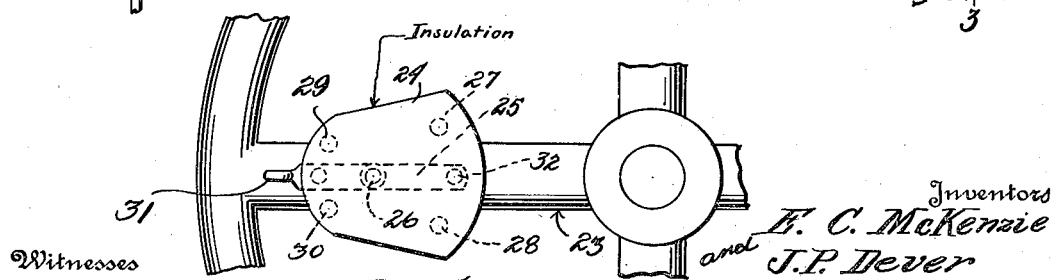

UNITED STATES PATENT OFFICE.

ELMER C. McKENZIE AND JOSEPH P. DEVER, OF TOLEDO, OHIO.

AUTOMOBILE-SIGNAL.

1,201,482.   Specification of Letters Patent.   Patented Oct. 17, 1916.

Application filed November 22, 1915, Serial No. 62,876.  Renewed September 9, 1916.  Serial No. 119,281.

*To all whom it may concern:*

Be it known that we, ELMER C. McKENZIE, and JOSEPH P. DEVER, citizens of the United States, residing at Toledo, in the county of Lucas, State of Ohio, have invented certain new and useful Improvements in Automobile-Signals; and we do hereby declare the following to be a full, clear, and exact description of the invention, such as will enable others skilled in the art to which it appertains to make and use the same.

This invention relates to improvements in automobile signals.

The principal object of the invention is to provide a novel and efficient means for signaling to other vehicles approaching from the front or rear that a change of direction is to be made.

Another object is to provide a novelly constructed lamp which is adapted to be attached to the side of the wind-shield of an automobile and so constructed and arranged that it will take the place of the ordinary side lamps.

Another object is to provide danger and clear signals at each side of the front of the automobile with a controlling device on the steering wheel by means of which when a change of direction is to be made, the clear signal on the side of the car toward the direction to be taken will be extinguished and the danger signal displayed, while at the same time the clear signal on the other side of the car will remain visible, and vice versa.

Other objects and advantages will be apparent from the following description when taken in connection with the accompanying drawing.

In the drawing: Figure 1 is a diagrammatic view showing the wiring of our signaling system; Fig. 2 is an elevation of a wind-shield showing the lamps in position; Fig. 3 is an enlarged vertical section on the line 3—3 of Fig. 2; and Fig. 4 is a plan view of the switch carried by the steering wheel.

Referring particularly to the accompanying drawing, 10 represents the side standards of the wind-shield, each of which has detachably secured thereto a clamping bracket 11 to which is connected a lamp casing 12. This lamp casing includes a central cylindrical body 13 and the oppositely flaring ends 14 and 15, the former of which is slightly wider than the latter. The outer end of the forward flaring portion has a disk of clear glass 16, while in the outer end of the rear flaring portion is a disk of red glass 17. At the point of juncture between the cylindrical body and the large flaring portion is an interior surrounding groove 18 in which is seated the periphery of a disk of red glass 19. Mounted within the cylindrical body in rear of the glass 19 is an electric lamp bulb 20. Mounted within the forward flaring portion, and below the line of the cylindrical body is a second lamp 21, in rear of which is an outwardly extending guard plate 22 in the form of a reflector to project the light downwardly on the road and at the same time prevent the rays of light from the lamp from shining through the red glass disks 17 and 19 and being seen from the rear.

On one of the spokes 23 of the steering wheel is mounted a plate of insulation 24, and pivotally mounted on this plate is a horizontally swinging switch lever 25, the same being mounted on a metallic pivot 26. On one end of the plate, and concentrically with the pivot 26 are two contact members 27 and 28 adapted to be engaged by the rear end of the said lever. On the other end of the plate, and also concentrically arranged with respect to the pivot point of the lever are two other contact members 29 and 30. A suitable finger hold 31 is provided on one end of the lever and is adapted to be grasped to swing the lever on its pivot. Another contact member 32 is carried by the first-named end of the plate 24 and intermediate the members 27 and 28. These lamps may be in a separate battery circuit on the automobile, or may be in the regular lighting circuit, as desired, a separate battery being shown on the drawing for the purpose of illustration. Connecting the adjacent sides of the lamps 21 is a wire 33, and extending from this wire to the contact member 32 is a wire 34. Connecting the same sides of the lamps, respectively, with the two contact members 27 and 28 are wires 35 and 36. From the other side of each of the lamps 21 is a wire 37, both of said wires being connected to one side of the battery 38. Connecting the pivot 26 with the other side of the battery is a wire 39. Connecting one side of the lamp 20 at one side of the machine with the contact member 29 is a wire 40, and similarly connecting one side of the other red lamp 20 with the other contact member 30 is a wire 41. The other side of each of the red lamps 20 is connected to the same side of the battery as the wires 37, by means of the wires 42.

In normal position, when the lever 25 contacts with the member 32 current from the battery will flow by means of the wire 39, through the pivot 26, the lever, the contact member 32, the wire 34, thence branching to the lamps 21 by means of the wire 33 and returning to the other side of the battery by means of the wires 37. Both white lamps or lamps 21 are burning and the rear or red lamps 20 extinguished. Should the driver decide to turn to the right, he moves the lever 25 to the right which brings the inner end of the lever into contact with the member 27 and the other end into contact with the member 30. This will extinguish the white lamp 21 on the right side of the machine and light the red lamp on that same side. In this case, the current will pass from the battery through the wire 39, pivot 26, lever, contact member 27, wire 35, white lamp on the left side of the machine, back to the battery. The current will also divide at the pivot 26, so that some of it will pass through the lever, into contact member 30, and through the wire 41 to one side of the red lamp on the right hand side of the machine, thence returning to the battery by means of the wire 42. An approaching vehicle from front or rear will have displayed to its driver a red light on the right hand side of the vehicle toward which it is approaching and by this sign the driver will know that there is danger of proceeding toward his left and to the other fellow's right. The mere presence of the red lamp on either side of the machine will indicate to the approaching driver that he is to avoid that side of the machine. When the switch lever is thrown to the left, the white lamp on the left side of the machine is extinguished and the red lamp lighted while at the same time the white lamp on the right side will remain lighted.

What is claimed is:

1. An automobile signaling device comprising pairs of electric lamps mounted on the opposite sides of the forward portion of the automobile, one of each of the pairs of lamps being visible only from the front, and normally lighted, each other of the pairs of lamps being visible from both front and rear when lighted, and a controlling switch for simultaneously extinguishing the forwardly visible lamp of one pair and lighting the doubly visible lamp of the other pair.

2. A signal for an automobile comprising a pair of casings mounted on opposite sides of the automobile, each of said casings being divided into front and rear compartments by colored translucent disks of glass, a similar disk being mounted in the rear of the rear compartment, a transparent disk mounted in the forward end of the forward compartment, an electric lamp mounted in the rear compartment and visible through the colored disks from the front and rear, an electric lamp mounted in the forward compartment, a reflecting shield mounted at the rear of the last-named lamp to prevent its rays of light being seen from the rear, and means for simultaneously lighting the lamp of the rear compartment and extinguishing the lamp of the front compartment.

In testimony whereof, we affix our signatures in the presence of two witnesses.

ELMER C. McKENZIE.
JOSEPH P. DEVER.

Witnesses:
LEONARD E. DONOVAN,
JOHN R. HARRY.